No. 890,083. PATENTED JUNE 9, 1908.
T. W. MORGAN.
RATCHET COUPLING.
APPLICATION FILED MAY 11, 1907.
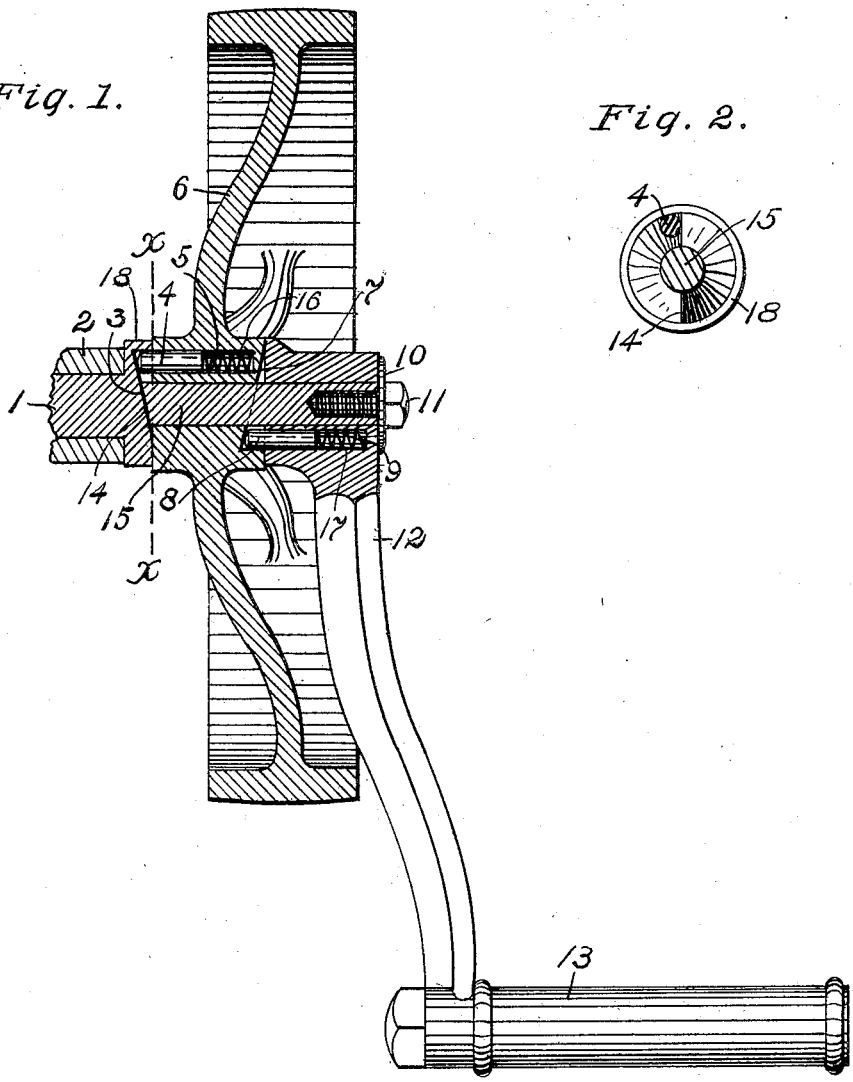
WITNESSES:
INVENTOR
Thomas W. Morgan,
BY
ATTORNEY

UNITED STATES PATENT OFFICE.

THOMAS W. MORGAN, OF WATERLOO, IOWA, ASSIGNOR TO WILBUR W. MARSH, OF WATERLOO, IOWA.

RATCHET-COUPLING.

No. 890,083.  Specification of Letters Patent.  Patented June 9, 1908.

Application filed May 11, 1907. Serial No. 373,183.

*To all whom it may concern:*

Be it known that I, THOMAS W. MORGAN, a citizen of the United States of America, and a resident of Waterloo, Blackhawk county, Iowa, have invented certain new and useful Improvements in Ratchet-Couplings, of which the following is a specification.

My invention relates to improvements in ratchet-couplings, and the object of my improvements is to provide for a centrifugal cream separator or other similar machine means whereby either a band-wheel or a hand-crank may be coupled at will to the drive-shaft, or disconnected respectively from the same. This object I have accomplished by the means which are hereinafter described and claimed, and which are illustrated in the accompanying drawings, in which—

Figure 1 is a central vertical axial section of my improved duplex ratchet-coupling, and Fig. 2 is a section thereof on the line $x$—$x$ in Fig. 1, depicting the toothed engaging faces of the coupling.

Similar numbers refer to similar parts throughout the several views.

The drive-shaft 1 is seated in a bearing 2, and projects outwardly therefrom having an enlarged portion 18 of greater diameter and a projecting spindle 15 of less diameter. The outer face of the enlargement 18 is provided with the teeth 14, as shown in Fig. 2. The band-wheel 6 has its hub adapted to be rotatably seated on the spindle 15, and the inner face of its hub has a drilled hole 5 therein parallel to the axis of spindle 15, and in said hole a spiral spring 16 is seated. Within said hole upon said spring 16 is seated a slidable pin 4, its outer end adapted to be projected normally out of the hole by the said spring's pressure. The outer end of the pin 4 thus contacts with the outer face of the enlargement 18, and when the band-wheel 6 is rotated comes in engagement with one of the teeth 14, and causes the shaft 1 to likewise rotate. When the rotation of the band-wheel 6 is arrested, the drive-shaft 1 continues in rotation, the pin 4 slipping over the teeth 14 being pressed back by them into the hole 5 when each tooth passes over it. The crank 12, having a handle 13, has a hub made to fit over the spindle 15, and both it and the hub of the band-wheel 6 are secured upon the spindle 15 by means of a screw 11 fitting in the end of the spindle, a washer 10 being secured therebetween.

The outer face of the hub of the band-wheel 6 is provided with teeth 7 in all respects the same as the teeth 14 on the outer face of the enlargement 18. The hub of the crank 12 has on its inner face a hole 17 parallel to the axis of the spindle 15, and forms a seat for a spiral spring 9 and the pin 8 superposed thereupon. As in the case of the pin 4, the outer end of the pin 8 normally projects and engages a tooth 7 of the band-wheel hub, and when the crank 12 is rotated such pin engages such tooth and causes the shaft 1 to likewise rotate. When the rotation of the crank 12 is arrested, the band-wheel hub and shaft 1 continue their rotation until they naturally come to a stop, the pin 8 sliding over the teeth 7, and moving into the hole 17 against the spring 9. By these means either the crank or the band-wheel may be used as desired, in either event a positive engagement resulting to drive the shaft 1, and in either case the band-wheel or crank may be stopped without interfering with the rotation of said shaft 1.

Having described my invention, what I claim as new, and desire to secure by Letters Patent, is—

In combination, a shaft having a toothed outer face and having an outwardly projecting spindle, a band-wheel rotatably seated on said spindle and provided with a bearing-hole on its inner side, the outer side of said band-wheel having a hub provided on its outer face with teeth, a compression spring in said bearing-hole, a slidable pin in said bearing-hole upon said spring, said pin adapted to engage a tooth on the outer face of said shaft when said band-wheel is rotated in one direction, and be disengaged therefrom when rotated in the reverse direction, a crank having a hub rotatably seated on said spindle and such hub having a bearing-hole in its inner face, a compression-spring seated in said bearing-hole and a slidable pin seated in said hole upon said spring, said pin adapted to engage a tooth on said band-wheel hub when the crank is rotated in one direction and to disengage therefrom when the crank's rotation is arrested.

Signed at Waterloo, Iowa, this 23rd day of April, 1907.

THOMAS W. MORGAN.

Witnesses:
O. D. YOUNG,
G. C. KENNEDY.